(12) United States Patent
Yamamoto et al.

(10) Patent No.: US 10,027,921 B2
(45) Date of Patent: Jul. 17, 2018

(54) DISPLAY DEVICE WITH MOVABLE STAND

(71) Applicant: SONY CORPORATION, Tokyo (JP)

(72) Inventors: Takeshi Yamamoto, Tokyo (JP);
Katsuyuki Nikaido, Tokyo (JP);
Hiroaki Nemoto, Tokyo (JP); Yusuke Mori, Chiba (JP); Masahiro Takahashi, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/613,556

(22) Filed: Feb. 4, 2015

(65) Prior Publication Data

US 2015/0230358 A1 Aug. 13, 2015

(30) Foreign Application Priority Data

Feb. 13, 2014 (JP) .................................. 2014-025432

(51) Int. Cl.
*H04N 5/64* (2006.01)

(52) U.S. Cl.
CPC .................................. *H04N 5/64* (2013.01)

(58) Field of Classification Search
CPC .......... H04N 5/64; H04N 5/642; H04N 5/645; H04R 1/02; H04R 1/025; H04R 1/026; H04R 1/028; H04R 1/2815; H04R 1/2819; H04R 1/2892
USPC ....................................................... 381/333
See application file for complete search history.

(56) References Cited

U.S. PATENT DOCUMENTS

| | | | | |
|---|---|---|---|---|
| 7,280,665 | B2 * | 10/2007 | Tamura .................. | H04N 5/642 348/E5.13 |
| 8,270,652 | B2 * | 9/2012 | Caldes .................. | H04R 1/028 181/148 |
| 8,295,534 | B2 * | 10/2012 | Hamada ............... | G06F 1/1605 381/333 |
| 9,298,214 | B2 * | 3/2016 | Mukaide ................. | H04N 5/64 |
| 2006/0198545 | A1 * | 9/2006 | Che ........................ | H04R 1/026 381/388 |
| 2007/0154041 | A1 * | 7/2007 | Beauchamp ............. | H04S 3/00 381/306 |
| 2007/0200471 | A1 * | 8/2007 | Boone .................. | D06F 95/002 312/211 |
| 2011/0135133 | A1 * | 6/2011 | Choi ..................... | G06F 1/1601 381/333 |
| 2013/0004006 | A1 * | 1/2013 | Onogi .................... | H04N 5/642 381/333 |
| 2013/0294107 | A1 | 11/2013 | Ohkawa et al. | |
| 2015/0163576 | A1 * | 6/2015 | Truong ................. | H04R 1/028 381/333 |
| 2016/0131821 | A1 * | 5/2016 | Shimizu ............... | G02B 6/0068 348/725 |

FOREIGN PATENT DOCUMENTS

JP 2013-218954 A 10/2013

* cited by examiner

*Primary Examiner* — Jason R Kurr
(74) *Attorney, Agent, or Firm* — Chip Law Group

(57) ABSTRACT

A display device includes a panel module including a display cell; a front side exterior panel and a rear side exterior panel which sandwich the panel module therebetween from back and front; a driving circuit which drives the display cell; and a stand which is separately provided from the rear side exterior panel, includes a speaker box inside which a first speaker is built-in, and is located on a lower rear side of the rear side exterior panel when placing the panel module.

8 Claims, 6 Drawing Sheets

DISPLAY DEVICE WITH MOVABLE STAND

CROSS REFERENCE TO RELATED APPLICATIONS

This application claims the benefit of Japanese Priority Patent Application JP 2014-025432 filed Feb. 13, 2014, the entire contents of which are incorporated herein by reference.

BACKGROUND

The present technology relates to a display device.

In recent years, thin flat panel displays have spread worldwide. In a flat panel display, a display panel module, and an exterior panel (that is, housing) which accommodates the display panel module are provided. A peripheral unit such as a tuner, a speaker, a driving circuit, or the like, is accommodated in a gap between the rear face of the display panel module and the exterior panel (for example, refer to Japanese Unexamined Patent Application Publication No. 2013-218954).

SUMMARY

In a flat panel display, since a display panel module is formed so as to be extremely thin, a center of gravity position becomes extremely close to the display panel module. For this reason, in order to prevent falling over of the flat panel display, it is necessary to allow a stand to protrude forward from an exterior panel. However, in such a case, the stand causes a limitation in design in the flat panel display. It is desirable to provide a display device in which a limitation in design due to a stand is relieved.

According to an embodiment of the present technology, there is provided a display device which includes a panel module including a display cell, and a front side exterior panel and a rear side exterior panel which sandwich the panel module therebetween from the front side and the rear side. The display device includes a driving circuit which drives the display cell. The display device further includes a stand which is separately provided from the rear side exterior panel. The stand is formed of a speaker box inside which a first speaker is built-in, and is located on the lower rear side of the rear side exterior panel when placing the panel module.

The display device according to the embodiment of the present technology is configured so that the stand which is separately provided from the rear side exterior panel is located on the lower rear side of the rear side exterior panel when placing the panel module, and the first speaker is built-in inside the speaker box. Due to this, a center of gravity position of the display device is close to the lower rear side, compared to a case in which the speaker box is provided integrally with the rear side exterior panel.

In the display device according to the embodiment of the present technology, since a center of gravity position of the display device is close to the lower rear side, it is possible to prevent falling of the display device without causing a stand to protrude forward from the front side exterior panel. As a result, it is possible to relax a limitation in design due to the stand. An effect of the present technology is not necessarily limited to the effect described herein, and may be any of effects which are described in the specification.

DETAILED DESCRIPTION OF EMBODIMENTS

Hereinafter, embodiments of the present technology will be described in detail with reference to drawings. In addition, descriptions will be made in the following order.
1. Embodiment (Display device)
Example in which fixed-type stand is provided (FIGS. 1 to 3)
2. Modification example (Display device)
Example in which opening is provided on front face (FIGS. 4, 6, 8, and 10)
Example in which reflecting plate is provided (FIGS. 5 and 6)
Example in which hinge is provided (FIGS. 7 to 10)
2. Embodiment

Configuration

Figure 1:
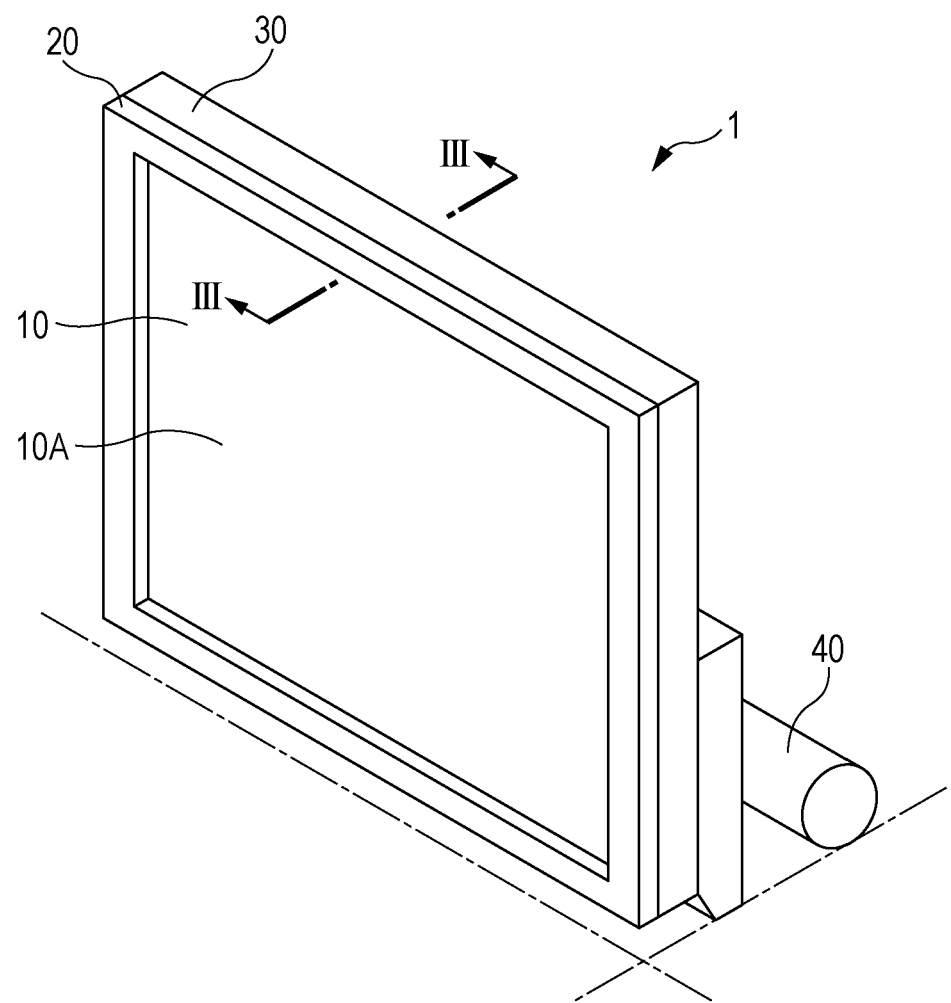
FIG. 1 is a diagram which illustrates an example of a display device according to one embodiment of the present technology in a perspective view.
Figure 2:
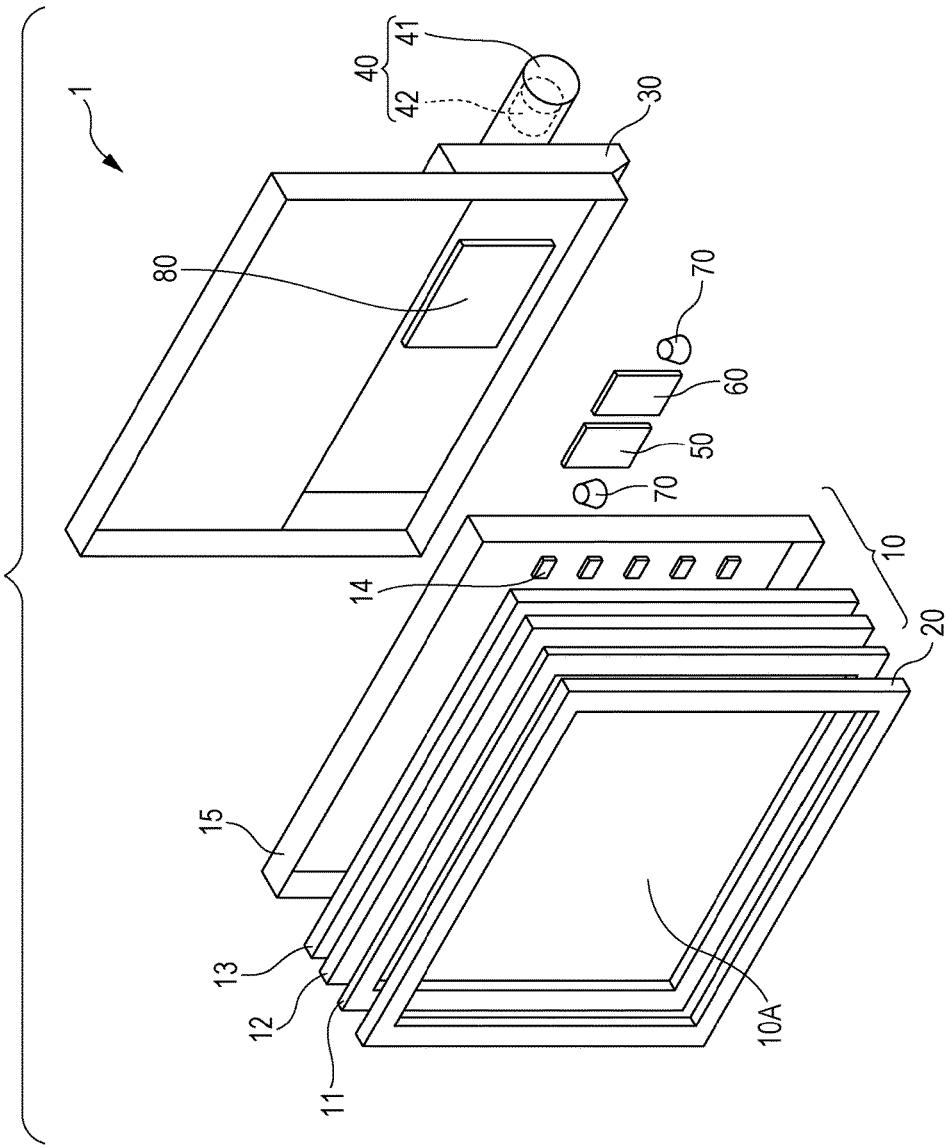
FIG. 2 is a diagram which illustrates an example of the display device in FIG. 1 in an exploded perspective view.
Figure 3:
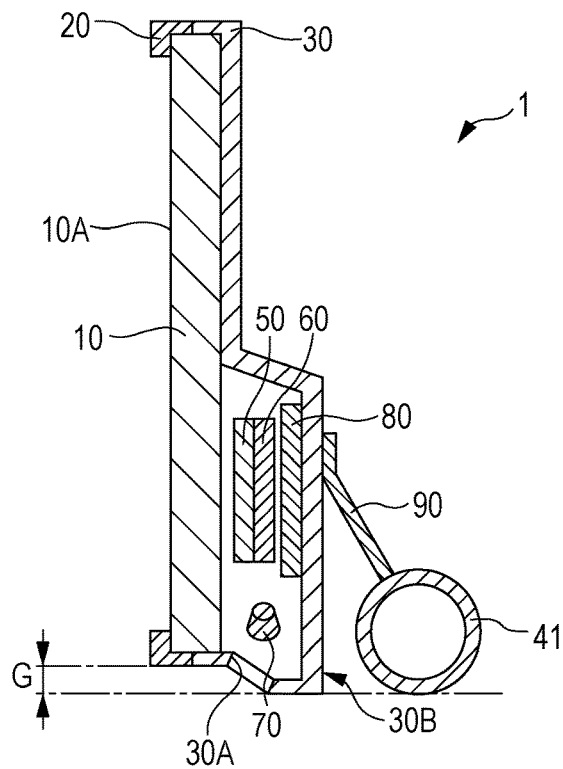
FIG. 3 is a diagram which illustrates an example of the display device in FIG. 1 in a cross-sectional view which is taken along line III-III.

FIG. 1 is a diagram which illustrates an example of a display device 1 according to one embodiment of the present technology in a perspective view. FIG. 2 is a diagram which illustrates an example of the display device 1 in FIG. 1 in an exploded perspective view. FIG. 3 is a diagram which illustrates an example of the display device 1 in FIG. 1 in a cross-sectional view which is taken along line III-III. In FIGS. 1 to 3, the display device 1 is exemplified in a state of being placed on the surface in a predetermined place (for example, floor in room). In addition, in FIGS. 2 and 3, positions of a driving circuit board 50, a tuner circuit board 60, and a speaker 70 which will be described later do not correspond to each other.

The display device 1 includes a panel module 10, a front side exterior panel 20 and a rear side exterior panel 30 which sandwich the panel module 10 from the back and front, and a stand 40 which is separately provided from the rear side exterior panel 30. The display device 1 further includes the driving circuit board 50 and the tuner circuit board 60 which are arranged in a gap between the panel module 10 and the rear side exterior panel 30, and one or a plurality of speakers 70 which are arranged in the gap between the panel module 10 and the rear side exterior panel 30. The display device 1 may include a demultiplexer, a decoder, an image signal processing circuit, a graphic generation circuit, a sound signal processing circuit, a sound amplification circuit, and the like, for example, in the gap between the panel module 10 and the rear side exterior panel 30, in addition to these.

In addition, the panel module 10 corresponds to one specific example of the "panel module" of the present technology. The front side exterior panel 20 corresponds to one specific example of the "front side exterior panel" of the present technology. The rear side exterior panel 30 corresponds to one specific example of the "rear side exterior pane" of the present technology. The stand 40 corresponds to one specific example of the "stand" of the present technology. The driving circuit board 50 corresponds to a specific example of the "driving circuit board" of the present technology. The tuner circuit board 60 corresponds to one specific example of the "tuner circuit board" of the present technology. The speaker 70 corresponds to one specific example of the "second speaker" of the present technology.

The front side exterior panel 20 is a frame-shaped member which covers a front face outer edge portion of the panel module 10. The rear side exterior panel 30 is a plate-shaped member which covers the entire rear face of the panel module 10, and accommodates the driving circuit board 50, the tuner circuit board 60, and one or a plurality of the speakers 70. The driving circuit board 50 drives a display cell 12 which will be described later, and is included in the panel module 10. The tuner circuit board 60 processes a television broadcasting signal which is input from the outside, and performs a channel selecting operation or a tuning operation, for example.

A peripheral circuit (driving circuit board 50, tuner circuit board 60, or the like) which is arranged between the panel module 10 and the rear side exterior panel 30 is arranged so as not to obstruct a path through which sound from the speaker 70 is guided to the front face of the display device 1. The speaker 70 is a speaker for middle and high registers. The driving circuit board 50, the tuner circuit board, and the speaker 70 are arranged at a position facing the rear face of the panel module. In addition, the speaker 70 may be arranged at a position between the lower face (lower end) of the panel module and the rear side exterior panel 30.

The lower end of the front side exterior panel 20 does not come into contact with the surface on which the display device 1 is placed (hereinafter, simply referred to as "floor"), and a predetermined gap G exists between the lower end of the front side exterior panel 20 and the floor. In addition, the lower end of the rear side exterior panel 30 becomes a bottom structure 30B. The bottom structure 30B comes into contact with the floor when the display device 1 is placed on the floor, and creates the gap G. The bottom structure 30B is a structure which protrudes on the floor side more than the lower end of the front side exterior panel 20, and has an opening 30A which guides the sound from the speaker 70 to the front side. The opening 30A communicates with the gap G, and is provided on the rear side more than the lower end of the panel module 10.

The panel module 10 includes, for example, a front chassis 11, the display cell 12, an optical sheet 13, a light source 14, and a back chassis 15. The front chassis 11 is arranged in front of the display cell 12. The optical sheet 13, the light source 14, and the back chassis 15 are arranged from the rear face of the display cell 12 in this order, on the rear side of the display cell 12.

The front chassis 11 is a frame-shaped metallic member which covers the front face outer edge portion of the display cell 12. The front chassis 11 has a function of suppressing deformation of the display cell 12 due to a force from the outside. The front chassis 11 can be omitted as necessary. The back chassis 15 accommodates the display cell 12, the optical sheet 13, and the light source 14. The back chassis 15 has a function of suppressing deformation of the display cell 12 due to a force from the outside. In addition, the back chassis 15 supports the light source 14, and also functions as a backlight chassis. The back chassis 15 is, for example, a plate-shaped metallic member which covers the entire rear face of the panel module 10. In addition, the back chassis 15 may be a lattice-shaped metallic member which is arranged in a matrix.

The display cell 12 outputs image light from the front face by modulating light which is input to the rear face of the display cell 12. The display cell 12 is configured of, for example, an optical modulating cell such as a liquid crystal cell. In the display cell 12, the surface on the front side exterior panel 20 side becomes an image display face 10A. The optical sheet 13 is a sheet for uniformizing in-plane luminance distribution of light from the light source 14, and is configured by including, for example, a prism sheet, a diffusing sheet, or the like. The light source 14 irradiates the rear face of the display cell 12 with light. The light source 14 is configured of, for example, a plurality of light emitting diodes (LEDs) which are arranged in a matrix. In addition, the light source 14 may be configured of a plurality of cold-cathode tubes, or the like, which are arranged in parallel, or may be configured of a plurality of LEDs which are arranged in a line at an end portion of the panel module 10.

The panel module 10 includes a light guiding plate which outputs light from the light source 14 which is input from a side face toward the display cell 12 when the light source 14 is configured of the plurality of LEDs which are arranged in a line at the end portion of the panel module 10. The optical sheet 13 is arranged between the front chassis 11 and the display cell 12, and the light source 14 is omitted when the display cell 12 is configured by including a plurality of self-luminous light emitting elements (for example, organic electro-luminescence (EL) elements) which are arranged in a matrix.

As described above, the stand 40 is separately provided from the rear side exterior panel 30. Here, "separately" means that the stand 40 is not integrally formed with the rear side exterior panel 30, and in addition, it means that an internal space of the stand 40 and an internal space of the rear side exterior panel 30 do not communicate with each other. The stand 40 is arranged on the lower rear side of the rear side exterior panel 30 when placing the display device 1 (or panel module 10). Accordingly, the stand 40 functions as a stand for the panel module 10. The stand 40 is arranged on the lower rear side of the rear side exterior panel 30 by being separated therefrom at a position facing the rear face of the rear side exterior panel 30. The stand 40 is arranged so as not to obstruct a path through which sound from the speaker 70 is guided to the front face of the display device 1. The stand 40 has a configuration in which a speaker 42 is built-in inside the speaker box 41.

The speaker 42 is a speaker for a lower register (woofer). The lower register is, for example, a register of 300 Hz or less. Accordingly, the display device 1 includes a two-way speaker system in which a band which is received by the display device 1 is divided into two tones of a high tone and a low tone. In addition, when the speaker 70 is formed of a speaker for a middle register and a speaker for a high register, the display device 1 includes a three-way speaker system in which the band which is received by the display device 1 is divided into three tones of a high tone, a middle tone, and a low tone. Usually the speaker 42 is larger than the speaker 70, and is heavy.

The speaker box 41 has a tubular shape of which both ends are closed, and for example, has a cylindrical shape of which both ends are closed. When the stand 40 includes two speakers 42, each of the speakers 42 is arranged at both end portions of the speaker box 41, by facing the end portion side. In this manner, sound from each speaker 42 propagates forward by going around both sides of the panel module 10. In addition, the speaker box 41 may be configured by including two tubes of which both ends are closed. In this case, each of the speakers 42 is arranged at each tube of the speaker box 41.

The display device 1 further includes a metal plate 80 and a connection unit 90. The metal plate 80 is arranged so as to be close to the lower side in a gap between the panel module 10 and the rear side exterior panel 30. The metal plate 80 is bonded onto a face on the rear face side of the panel module 10 in the rear side exterior panel 30. In addition, the metal plate 80 may also be bonded onto the rear face of the panel module 10. The connection unit 90 connects the stand 40 and the rear face of the rear side exterior panel 30 to each other. Further, the connection unit 90 is connected to the metal plate 80. The connection unit 90 includes, for example, a plate-shape metallic member and a male screw. The plate-shaped metallic member, the rear side exterior panel 30, and the metal plate 80 are fixed to each other using the male screw. The connection unit 90 further includes a separate male screw, and the plate-shaped metallic member and the speaker box 41 are fixed to each other using the male screw. Accordingly, the connection unit 90 and the stand 40 are fixed to the metal plate 80 so that a relative position of the connection unit and the stand with respect to the panel module 10 does not fluctuate.

Effects

Subsequently, effects of the display device 1 according to the embodiment will be described. According to the embodiment, the stand 40 which is separately provided from the rear side exterior panel 30 is located on the lower rear side of the rear side exterior panel 30 when placing the panel module 10. In addition, the stand 40 has a configuration in which the speaker 42 for the low register is built-in inside the speaker box 41. In this manner, it is possible to prevent falling of the display device without causing the stand 40 to protrude forward from the front side exterior panel 20 since a center of gravity position of the display device 1 is close to the lower rear side compared to a case in which the speaker box 41 is integrally provided with the rear side exterior panel 30. As a result, it is possible to relieve a limitation in design due to the stand 40.

In addition, according to the embodiment, the stand 40 is arranged so as not to obstruct a path thorough which sound from the speaker 70 is guided to the front face of the display device 1 when placing the display device 1. In this manner, even when the speaker 70 is arranged at a position facing the rear face of the panel module 10, it is possible to propagate the sound from the speaker 70 with respect to a user of the display device 1.

2. Modification Example

Subsequently, a modification example of the display device 1 according to the above described embodiment will be described. In addition, hereinafter, common configuration elements with respect to those in the display device 1 in the above described embodiment are given the same reference numerals. In addition, descriptions of configuration elements which are the same as those of the display device 1 in the above described embodiment will be appropriately omitted.

Modification Example 1

Figure 4:
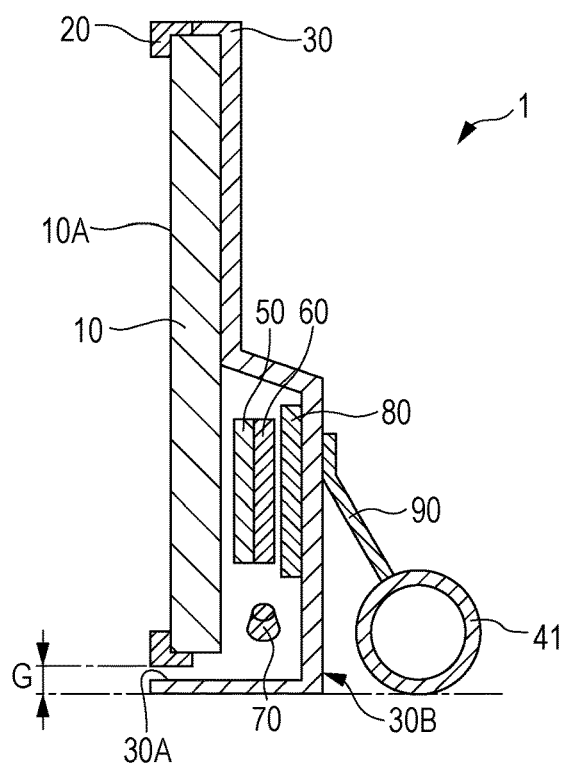
FIG. 4 is a diagram which illustrates one modification example of the display device in FIG. 3.

FIG. 4 illustrates one modification example of the display device 1 in the above described embodiment in a cross-section. According to the above described embodiment, the opening 30A is provided on the rear side of the panel module 10; however, for example, as illustrated in FIG. 4, the opening may be provided on the front face of the display device 1. In such a case, sound from the speaker 70 can be efficiently guided forward. In addition, even in this case, it is possible to prevent falling of the display device without causing the stand 40 to protrude forward from the front side exterior panel 20. Accordingly, it is possible to relieve a limitation in design due to the stand 40.

Modification Example 2

Figure 5:
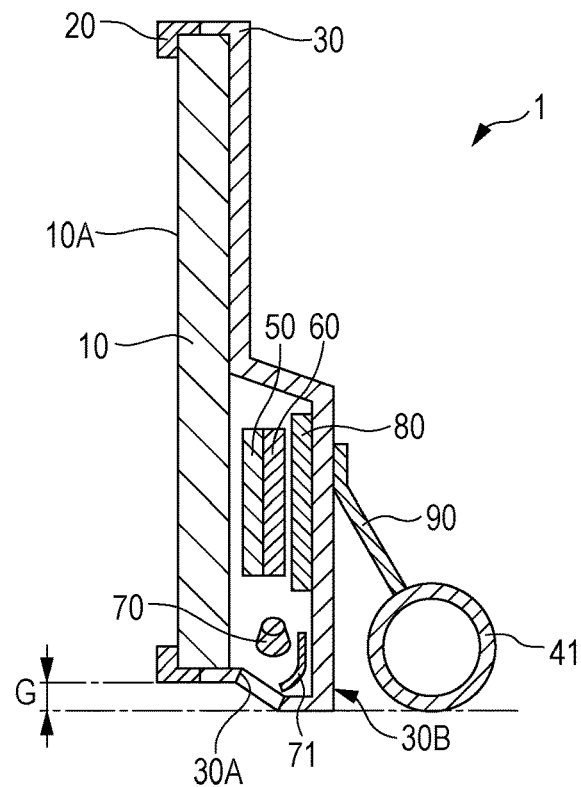
FIG. 5 is a diagram which illustrates one modification example of the display device in FIG. 3.
Figure 6:
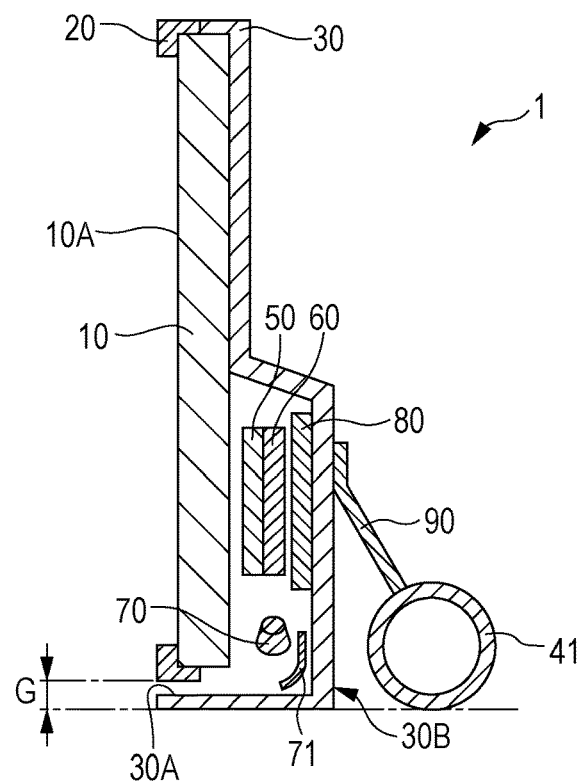
FIG. 6 is a diagram which illustrates one modification example of the display device in FIG. 4.

FIG. 5 is a diagram which illustrates one modification example of the display device 1 in FIG. 3 in a cross-section. FIG. 6 is a diagram which illustrates one modification example of the display device 1 in FIG. 4 in a cross-section. In the above described embodiment and the modification example thereof (Modification Example 1), the bottom structure 30B may include a reflecting plate 71 which reflects sound from the speaker 70 on the front side exterior panel 20 side as illustrated in FIGS. 5 and 6, for example. In such a case, it is possible to efficiently guide the sound from the speaker 70 forward. In addition, even in such a case, it is possible to prevent falling of the display device without causing the stand 40 to protrude forward from the front side exterior panel 20. Accordingly, it is possible to relieve a limitation in design due to the stand 40.

Modification Example 3

Figure 7:
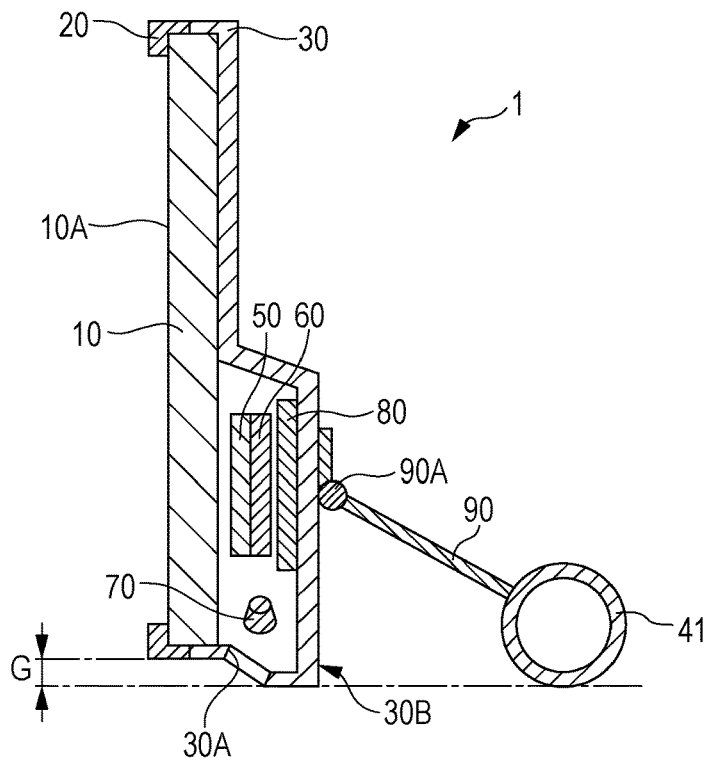
FIG. 7 is a diagram which illustrates one modification example of the display device in FIG. 3.
Figure 8:
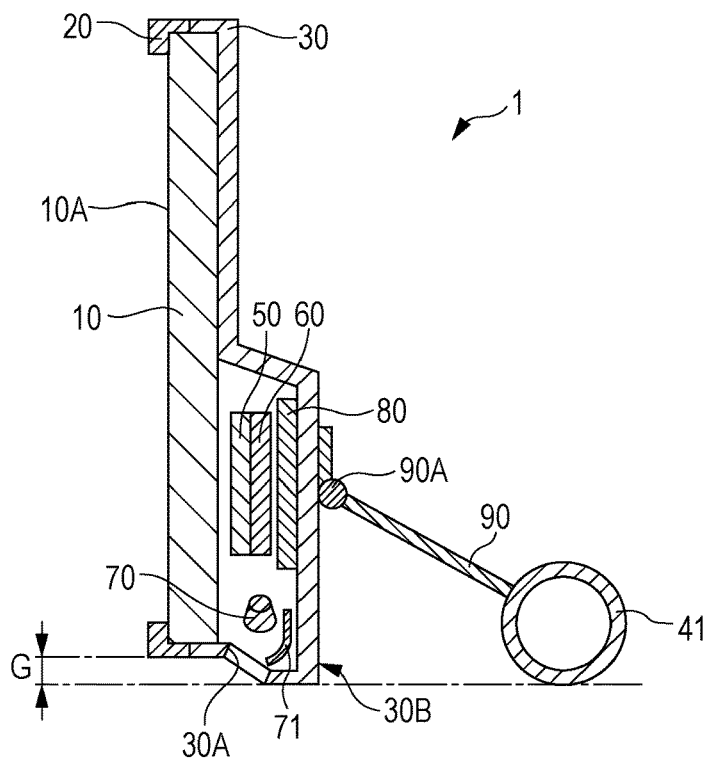
FIG. 8 is a diagram which illustrates one modification example of the display device in FIG. 5.
Figure 9:
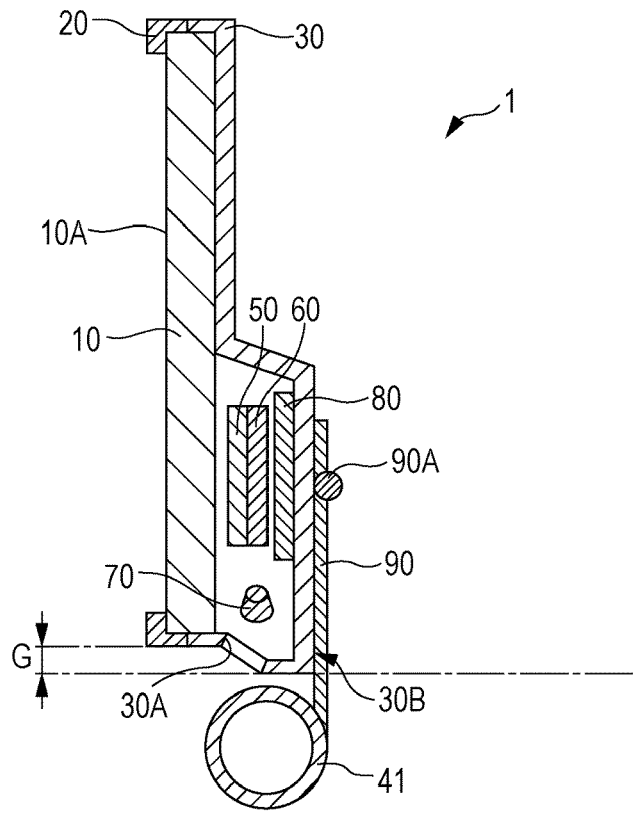
FIG. 9 is a diagram which illustrates one modification example of the display device in FIG. 7.
Figure 10:
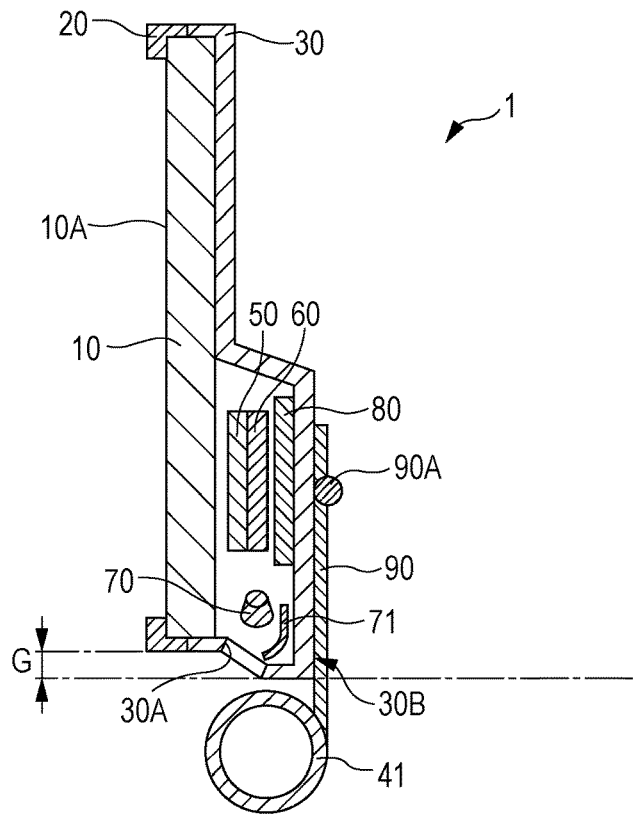
FIG. 10 is a diagram which illustrates one modification example of the display device in FIG. 8.

FIG. 7 is a diagram which illustrates one modification example of the display device 1 in FIG. 3 in a cross section. FIG. 8 is a diagram which illustrates one modification example of the display device 1 in FIG. 5 in a cross section. FIG. 9 is a diagram which illustrates one modification example of the display device 1 in FIG. 7 in a cross section. FIG. 10 is a diagram which illustrates one modification example of the display device 1 in FIG. 8 in a cross section. In the above described embodiment and the modification example (Modification Example 2), the connection unit 90 includes a hinge 90A which is a hinge-type appliance, and may be configured so as to rotate back and forth along with the stand 40 (or speaker box 41) by having the hinge 90A as a fulcrum. In such a case, it is possible to make a center of gravity of the display device 1 low by moving the stand 40 (or speaker box 41) to the lower rear side of the rear side exterior panel 30, by rotating the hinge 90A when placing the display device 1.

In addition, according to the modification example, the stand 40 is arranged so as not to obstruct the path through which sound from the speaker 70 is guided to the front face of the display device 1, when placing the display device 1. In this manner, even when the speaker 70 is arranged at a position facing the rear face of the panel module 10, it is possible to propagate the sound from the speaker 70 with respect to a user of the display device 1.

In addition, it is possible to move the stand 40 to the lower side of the rear side exterior panel 30 as illustrated in FIGS.

9 and 10, for example, by rotating the hinge 90A in the direction opposite to the above-described direction. In such a case, it is possible to mount the display device 1 on a wall. At this time, the stand 40 is arranged so as not to obstruct the path through which sound from the speaker 70 is guided to the front face of the display device 1. In this manner, even when the speaker 70 is arranged at a position facing the rear face of the panel module 10, it is possible to propagate the sound from the speaker 70 with respect to a user of the display device 1. In addition, in a case in which the surface of the speaker box 41 is configured so as to reflect sound of a middle register or a high register, when the stand 40 is arranged on the lower side of the rear side exterior panel 30, it is possible for a top face of the speaker box 41 to cause sound from the speaker 70 to reflect on the front face of the display device 1. In such a case, it is possible to transmit the sound of the middle register or the high register to a user of the display device 1 more clearly.

Hitherto, the present technology has been described using the embodiment and the modification examples thereof; however, the present technology is not limited to the above-described embodiment, or the like, and can be variously modified. In addition, the effect which is described in the specification is merely an example. The effect of the present technology is not limited to the effect which is described in the specification. The present technology may have an effect other than the effect which is described in the specification.

In addition, for example, the present technology can have the following configuration.

(1) A display device which includes a panel module including a display cell; a front side exterior panel and a rear side exterior panel which sandwich the panel module therebetween back and forth; a driving circuit board and a tuner circuit board which are arranged in a gap between the panel module and the rear side exterior panel, and drive the display cell; and a stand which is separately provided from the rear side exterior panel, is located on a lower rear side of the rear side exterior panel when placing the panel module, and in which a first speaker is built-in inside a speaker box.

(2) The display device described in (1) which further includes a connection unit which connects the speaker box and a rear face of the rear side exterior panel to each other.

(3) The display device described in (2) in which a metal plate which is arranged so as to be close to a lower side in a gap between the panel module and the rear side exterior panel is included, and in which the connection unit is connected to the metal plate.

(4) The display device described in any one of (1) to (3) which further includes a second speaker which is arranged in the gap between the panel module and the rear side exterior panel, in which the first speaker is a speaker for a low register, and the second speaker is a speaker for middle and high registers.

(5) The display device described in (4), in which the rear side exterior panel includes a bottom structure which generates a gap between the front side exterior panel and a surface when placing the panel module on the surface.

(6) The display device described in (5), in which the second speaker is arranged at a position facing a rear face of the panel module, and the bottom structure includes a reflecting plate which reflects sound from the second speaker on the front side exterior panel side.

(7) The display device described in any one of (1) to (6), in which the connection unit is fixed to the metal plate so that a position relative to the panel module does not fluctuate.

(8) The display device described in any one of (1) to (6), in which the connection unit includes a hinge, and is configured so as to rotate back and forth along with the speaker box by having the hinge as a fulcrum.

It should be understood by those skilled in the art that various modifications, combinations, sub-combinations and alterations may occur depending on design requirements and other factors insofar as they are within the scope of the appended claims or the equivalents thereof.

What is claimed is:
1. A display device, comprising:
   a panel module that includes a display cell;
   a first exterior panel;
   a second exterior panel;
   a metal plate,
      wherein the panel module is between the first exterior panel and the second exterior panel;
   a driving circuit configured to drive the display cell;
   a speaker box configured to function as a stand for the panel module,
      wherein the speaker box is further configured to come into contact with a surface if the display device is placed on the surface, and
      wherein the speaker box includes a first speaker; and
   a connection unit configured to attach the speaker box to the second exterior panel,
      wherein the connection unit is fixed to the metal plate so that a relative position of each of the connection unit and the stand with respect to the panel module remains constant, and
      wherein a lower side of the display device includes the metal plate in a gap between the panel module and the second exterior panel.

2. The display device according to claim 1, wherein the connection unit is connected to the metal plate.

3. The display device according to claim 2, further comprising:
   a second speaker in the gap between the panel module and the second exterior panel,
   wherein the first speaker is a speaker for a low register, and the second speaker is a speaker for a middle register and a high register.

4. The display device according to claim 3, wherein the second exterior panel includes a bottom structure,
   wherein the bottom structure is configured to separate the first exterior panel and the surface on which the display device is placed.

5. The display device according to claim 4, wherein the second speaker faces a face of the panel module, and
   wherein the bottom structure includes a reflecting plate which is configured to reflect sound from the second speaker.

6. The display device according to claim 2, wherein the connection unit includes a hinge, and
   wherein the connection unit is further configured to rotate back and forth, along with the speaker box, about the hinge.

7. The display device according to claim 1, further comprising a tuner circuit, wherein the tuner circuit is in a gap between the panel module and the second exterior panel.

8. The display device according to claim 1, wherein the speaker box is configured to move, based on the connection unit, from a first position in which the speaker box is configured to come into contact with the surface to a second position in which the speaker box is below the second exterior panel.

* * * * *